United States Patent
Schiegl et al.

(10) Patent No.: US 7,851,098 B2
(45) Date of Patent: Dec. 14, 2010

(54) REFORMER FUEL CELL SYSTEM WITH EXTERNAL BURNER

(75) Inventors: Andreas Schiegl, Oberhaching (DE); Reinhard Frank, München (DE); Sven Butschek, München (DE); Gunther Kolb, Mainz (DE)

(73) Assignee: Truma Geratetechnik GmbH & Co. KG, Putzbrunn (DE)

( * ) Notice: Subject to any disclaimer, the term of this patent is extended or adjusted under 35 U.S.C. 154(b) by 1299 days.

(21) Appl. No.: 11/375,947

(22) Filed: Mar. 15, 2006

(65) Prior Publication Data
US 2006/0210848 A1   Sep. 21, 2006

(30) Foreign Application Priority Data
Mar. 16, 2005 (EP) ................... 05005761

(51) Int. Cl.
*H01M 8/04*   (2006.01)
*H01M 8/02*   (2006.01)

(52) U.S. Cl. .............. 429/440; 429/423; 429/429; 429/433; 429/435

(58) Field of Classification Search ........... 429/17, 429/20, 198, 188, 26, 24
See application file for complete search history.

(56) References Cited

U.S. PATENT DOCUMENTS

| | | | | |
|---|---|---|---|---|
| 6,136,462 | A * | 10/2000 | Kriechbaum et al. | 429/24 |
| 2002/0136938 | A1 * | 9/2002 | Boneberg et al. | 429/17 |
| 2004/0241515 | A1 * | 12/2004 | Brenner et al. | 429/26 |
| 2005/0008909 | A1 * | 1/2005 | Kaye et al. | 429/20 |
| 2006/0019139 | A1 * | 1/2006 | Matsui et al. | 429/26 |

FOREIGN PATENT DOCUMENTS

| | | |
|---|---|---|
| DE | 19910387 | 9/2000 |
| DE | A-199 10 387 | 9/2000 |
| DE | 19931061 | 1/2001 |

(Continued)

OTHER PUBLICATIONS

Abstract of JP 2002053306, Kako et al., Feb. 2002.*

(Continued)

*Primary Examiner*—Jonathan Crepeau
*Assistant Examiner*—Kenneth Douyette
(74) *Attorney, Agent, or Firm*—D. Peter Hochberg; Sean F. Mellino; Daniel J. Smola

(57) ABSTRACT

A reformer fuel cell system having a plurality of components, that are a plurality of partial reformer systems forming a reformer for the generation of a hydrogen-rich gas and a fuel cell for the generation of electric current with use being made of the hydrogen-rich gas. A burner device is arranged outside of the reformer and the fuel cell is provided for the generation of a hot exhaust gas. An exhaust gas supply assembly supplies the exhaust gas to at least two of the components wherein the exhaust gas supply assembly defines the flow path of the exhaust gas such that the exhaust gas flows to and/or through the components according to the level of their particular operating temperature in descending temperature order. In this manner, it is easily possible to directly heat up the individual components to the level of their particular operating temperature in a selective manner.

36 Claims, 3 Drawing Sheets

FOREIGN PATENT DOCUMENTS

| | | |
|---|---|---|
| DE | A-199 31 061 | 1/2001 |
| DE | A-100 40 539 | 5/2001 |
| DE | 10032059 | 1/2002 |
| DE | A-100 32 059 | 1/2002 |
| DE | 10040539 | 3/2002 |
| DE | 10118618 | 10/2002 |
| DE | A-101 18 618 | 10/2002 |
| DE | 10315225 | 10/2004 |
| DE | A 103 15 225 A1 | 10/2004 |
| DE | 10324213 | 12/2004 |
| EP | 1081779 | 3/2001 |
| EP | 1228999 | 8/2002 |
| EP | 1376726 | 1/2004 |
| EP | 1557897 | 7/2005 |
| JP | 2002053306 A * | 2/2002 |
| WO | WO 2004021496 | 3/2004 |
| WO | WO 2004021496 A * | 3/2004 |

OTHER PUBLICATIONS

"Cost Analysis of Fuel Cell System Transporation", Ho et al., Arthur D Little, Inc. Cambridge, MA, Mar. 2000.*

* cited by examiner

REFORMER FUEL CELL SYSTEM WITH EXTERNAL BURNER

RELATED APPLICATION

This application claims foreign priority based on European Application No. 05 005 761.1, filed on Mar. 16, 2005, the content of which is incorporated herein by reference in its entirety.

BACKGROUND OF THE INVENTION

1. Field of the Invention

The present invention relates to a reformer fuel cell system. The present invention further relates to a method for starting and/or operating a reformer fuel cell system.

2. Description of the Prior Art

Reformer fuel cell systems have been known for a long time. A reformer consisting of a plurality of partial reformer systems generates from a primary fuel a hydrogen-rich gas which is used for the generation of electric current in a fuel cell. Known partial reformer systems are, for example, reformer devices, vaporizers, heat exchangers, shift stages, and gas fine-cleaning stages.

Small reformers for fuel cells with a low electric power have, for example, been disclosed in DE-A-100 40 539, DE-A-100 32 059 or DE-A-101 18 618.

Adequate heat supply is required for the startup and continuous operation of both the reformer and the fuel cell. Particularly if reformer fuel cell systems with low power are operated in the part load mode, there is the danger that the heat available is insufficient. As a result, the reformer process on the one hand and the fuel cell process on the other hand may deteriorate or even come to a standstill.

As has been disclosed in DE-A-199 10 387, an additional heating system the operating heat of which is used to heat a fuel cell stack is provided for heating up a fuel cell unit on cold start. The heating system heats a heat transport medium which is supplied through the reaction chamber of the fuel cell stack, thereby heating up the latter.

DE-A-199 31 061 has disclosed an arrangement for heating and cooling a fuel cell system in which a reformer can be integrated in addition to a burner and a cooler. A heating or cooling medium circulating in a closed circuit within the system serves to regulate the internal heat flux, especially to heat the gaseous medium flows supplied to the fuel cell.

DE 103 15 225 A1 describes a reformer fuel cell system in which, for heating purposes, the exhaust gas from an external burner or a heat transfer medium heated by an external burner can be supplied to the reformer or the fuel cell.

SUMMARY OF THE INVENTION

The object of the invention is to specify a reformer fuel cell system which permits to heat up the partial reformer systems and the fuel cell in a particularly selective manner while achieving a compact structure at the same time.

This problem is solved by the present invention by a reformer fuel cell system comprising a plurality of components including a plurality of partial reformer systems and a fuel cell, as well as a burner device and an exhaust gas supply assembly. The problem is also solved by a method employing the reformer fuel cell system according to the present invention, whereby the method includes supplying the exhaust gas to at least two of the components and/or to the fuel cell.

In a reformer fuel cell system according to the present invention, a burner device for generating a hot exhaust gas is arranged outside of the reformer and the fuel cell. Further, an exhaust gas supply assembly is provided for supplying the exhaust gas to at least two components, that is to at least one partial reformer system and/or to the fuel cell. Usually, the reformer consists of a plurality of partial reformer systems, that is an actual reformer device, a vaporizer, one or more heat exchangers, one or more shift stages, and one or more gas fine-cleaning stages. Below, the term "components" will denote said partial reformer systems as well as the actual fuel cell.

Thus, the exhaust gas supply assembly determines that the hot exhaust gas flows to or through at least two of the components. Therein, the flow path of the exhaust gas through the exhaust supply assembly is defined such that the exhaust gas flows to and/or through the components according to the level of their particular operating temperature in descending temperature order. That means that the exhaust gas first flows through the component with the highest operating temperature level. Thereafter, the exhaust gas flows into the component with the next lower operating temperature, etc. The exhaust gas increasingly cools down on its flow path. Since, however, it is selectively directed to its destination, it can deliver heat in each component it flows through, in order to reach and/or preserve the operating temperature required in this component.

Therein, it is possible that the exhaust gas either flows directly into the particular component itself or only flows past the outside of said component. Depending on the case of application or the heat transfer required, the exhaust gas supply assembly can be designed such that an adequate heat transfer from the exhaust gas into the reaction chamber of the component is ensured in the particular component.

In an advantageous embodiment of the invention, the exhaust gas supply assembly is designed such that the exhaust gas can flow to the components from the outside and the heat of the exhaust gas is transferred into reaction chambers of the components via walls from the outside. Thus, the exhaust gas does not have to enter inside the reaction chambers. It rather suffices for example that the exhaust gas flows past the outside of a wall of a particular reaction chamber in a component so that the wall is heated up.

The exhaust gas supply assembly is advantageous in that it comprises ducts for supplying the exhaust gas. This facilitates supply of the hot exhaust gas in a selective and purposeful manner.

In a further embodiment of the invention, the ducts are arranged in the reaction chambers of the components. Consequently, the exhaust gas is, here, supplied into the interior region of the reaction chambers and onto the inner walls of the reaction chambers or through the reaction chambers. It is understandable that, therein, the exhaust gas must not enter into the reaction chambers themselves and mix with the medium flows there. On the contrary, the heat of the exhaust gas is delivered into the reaction chambers via the walls of the ducts. Accordingly, the ducts also ensure that the exhaust gas leaves the reaction chambers again.

The surface of the ducts that are assigned to a particular component is effective for the transfer of heat from the exhaust gas into said component, said surface being adjusted to the heat requirements of said components, that is, for example, the length, number, cross-sectional shape and/or cross-sectional dimensions of the ducts. The heat requirements are determined by the heat necessary for reaching the operating temperature in the particular component. The amount of heat in the gas leaving the burner device or the individual components is known from the dimensioning of the burner device. By designing the ducts accordingly, it is possible to deliver, in a selective manner, the exact amount of heat in each component that is required for heating the component upon starting the system and/or for maintaining the operating temperature in the full load or part load operating mode. For example, it is possible to adjust the length of the ducts directed through the particular reaction chamber or directed past a reaction chamber. The longer the ducts and/or the higher the number of ducts assigned to a reaction chamber, the larger the amount of heat which the exhaust gas can deliver to the reaction chamber. The same applies to the cross-sectional shape: the smaller the cross-section of a duct, the higher the number of ducts provided must be, in order to ensure that the exhaust gas flows in a reliable manner. In view of that, the effective surface (external surface of the ducts) will be increased and deliver an increased amount of heat. Contrary thereto, a lower number of ducts which are, at the same time, larger in cross-section, ensures that the amount of heat delivered via the then smaller surface is relatively low. As a result, this heat can, for example, be distributed to the following components in an excellent manner.

In an advantageous embodiment of the invention, heating ducts which can, in like manner, be used by both the exhaust gas supplied by the exhaust supply assembly and a hot gas generated in the components themselves during operation of the system are provided in the components. In the operating state, flows of hot (gas) medium, e.g. finally the reformate gas itself, are generated in the components. After having left a particular component, this hot gas can initially be supplied through the heating ducts and to a further component to heat the latter. Only then will the gas reach its actual destination where it will either be processed further or—in the fuel cell itself—be consumed for the generation of electric current.

Accordingly, the heating ducts can either be used exclusively as ducts for the exhaust gas supply assembly, exclusively as ducts for the hot gas generated by the components themselves, or simultaneously for the exhaust gas and the heating gas. When the ducts are used simultaneously, however, it must be ensured that the exhaust gas is prevented from entering into the reaction chambers of the reformer or the fuel cell.

Preferably, the exhaust gas supply assembly allows a serial and/or a parallel flow through the components. Depending on how the temperature is controlled, the exhaust gas can, accordingly, flow through a plurality of components either successively or simultaneously.

In a further embodiment of the invention, the exhaust gas supply assembly is divided in a first supply section and a second supply section downstream of the burner device and upstream of the components respectively, wherein the exhaust gas flow is distributed to the two supply sections. Thus, the supply sections allow division of the exhaust gas flow downstream of the burner device and supply of said exhaust gas flow to the particular component in a selective manner.

Herein, it is to particular advantage if exhaust gas can be supplied to at least one of the partial reformer systems through the first supply section, while exhaust gas is supplied to the fuel cell through the second supply section. That means that the exhaust gas can be supplied directly from the burner device to the fuel cell.

In a particularly advantageous embodiment, secondary air can be supplied to at least one of the components. The secondary air allows for cooling of the exhaust gas in a selective manner, so that the temperature desired can be achieved for the particular component.

It is particularly advantageous if the secondary air can be admixed to the exhaust gas in the second supply section. Since, in the second supply section, the exhaust gas is directly coming from the burner device, it has a high temperature which might be too high for the fuel cell. If the exhaust gas is selectively cooled by admixing the secondary air thereto, the exhaust gas can be cooled down to a temperature that is appropriate for the fuel cell.

In a further embodiment of the invention, the exhaust gas flowing through the second supply section can be supplied to a heat exchanger which can be used to heat the secondary air which will then be supplied to the fuel cell. In this manner, it is not necessary to supply the exhaust gas itself to the fuel cell. On the contrary, it is only the heat of the exhaust gas that is transferred to the secondary gas and, from the secondary air, to the fuel cell.

It is particularly advantageous if the secondary air can be drawn off the primary air that is supplied to the burner device. The burner device anyhow needs primary air (combustion air) that is used to burn the fuel through the burner device. From the primary air, an airflow can easily be drawn off as secondary air and supplied to the second supply section.

Preferably, the secondary air can be delivered by a secondary air delivery assembly in a forced manner. This ensures that the secondary air is supplied to its destination in the amount desired. Above all, a controllable blower can appropriately be used as secondary air delivery assembly.

It is particularly advantageous if the secondary air delivery assembly can be activated independently of an operating state of the burner device. In this case, the secondary air delivery assembly can deliver secondary air even if the burner device is turned off. During operation, for example, the secondary air can be used to cool the fuel cell even if the burner device itself is not operated any longer.

In a particularly advantageous embodiment of the invention, those of the components that require as similar an operating temperature as possible are arranged adjacent to each other. In this manner, it is possible to minimize the measures for insulating the components from each other. Furthermore, the exhaust gas flow can be supplied from one component to the next in a simple manner.

It is particularly advantageous if, in relation to their particular operating temperature, the components are arranged next to each other and/or one after the other in descending temperature order. This allows supplying the exhaust gas from one component to the next in a simple manner.

Any type of device for generating a hydrogen-rich gas from a primary fuel is considered to be a reformer according to the invention. This includes reformers (reformer devices) in the actual sense, but also crack reactors which can also be used for generating the gas in a known manner. In the present text, the term "reformer" is, therefore, defined in a broader sense than in the actual technical sense. This, however, seems appropriate in order to prevent the text from being overloaded by incessantly making double use of the terms reformer and crack reactor.

Low-temperature polymer electrolyte membrane fuel cells or high-temperature polymer electrolyte membrane fuel cells can be used as fuel cells. The structure of the fuel cells is known. A single fuel cell or a stack or a plurality of stacks of fuel cells can be understood as a fuel cell in the sense according to the invention. As a matter of course, it is known that a reformer fuel cell system usually requires a plurality of series-connected single fuel cells in order to obtain a useful electric voltage.

Preferably, a thermal insulation is provided between neighboring components. The thermal insulation allows keeping the operating temperatures required in the individual components in a highly precise manner, in order to maintain the efficiency of the system at an optimum level and to prevent damage to the components.

At least some of the components can form a structural unit. As an alternative, it is also possible to arrange some components that are neighboring each other such that they are separated from each other spatially, that is preferably such that they are spaced apart from each other.

It is particularly advantageous if the burner device can be operated with the same primary fuel which is also used to generate the hydrogen-rich gas. In this manner, it is sufficient to provide one uniform fuel for the entire reformer fuel cell system.

In a particularly advantageous embodiment of the invention, the burner device can be supplied with primary air (combustion air) for burning the primary fuel and generating the exhaust gas, while the exhaust gas can be supplied with secondary air. Accordingly, the secondary air is supplied downstream of the burner device, in order to cool the exhaust gas (see also above: "secondary air"). In this manner, the components that are first as seen in the flow direction can be prevented from overheating.

Preferably, the secondary air can be delivered by a secondary air delivery assembly in a forced manner, wherein said secondary air delivery assembly can also be formed by an air delivery assembly (air supply assembly) of the burner device, said air delivery assembly additionally delivering the primary air.

By admixing the secondary air, it is possible to achieve various air stoichiometries the air factor $\lambda$ of which deviates from the stoichiometrically balanced value 1.0. The more secondary air is admixed, the higher is the air factor $\lambda$.

The burner device should be operated with air stoichiometries with an air factor $\lambda$ ranging from 1.0 to 4.0, preferably from 1.2 to 3.0. Therein, air stoichiometries of the burner device should be aimed at that defined in relation to the operating temperature of that component that has the highest operating temperature value. This ensures that the burner device supplies the component having the highest heat requirements on start and during operation with sufficient heat. If the exhaust gas supply assembly and/or the ducts pertaining thereto are designed appropriately, the following components can then be supplied with heat in the manner described above.

It is particularly advantageous if an air supply assembly is provided for supplying combustion air to the burner device and the air supply assembly also serves to deliver the exhaust gas through the exhaust gas supply device. In this manner, the air supply assembly generates the necessary pressure difference in the exhaust gas supply assembly required for ensuring that the exhaust gas is reliably flowing through and out.

It is, furthermore, advantageous if the burner device is an integral part of a heating device for generating heat for a usable space, in particular a usable space in a mobile equipment, such as a motor home, a travel trailer, a commercial vehicle, or a boat. The heating device, for example a cab heater or a gas heater in a motor home is anyhow provided to maintain the temperature in the usable space at an agreeable level for the occupant. After having left the reformer fuel cell system, that is after having heated the components, the exhaust gas of the burner device can then also be used to heat the usable space, if so desired. As a matter of course, the exhaust gas can, alternatively, also be discharged directly to the environment through a chimney.

To achieve this, a heat exchanger is, preferably, arranged in the exhaust gas flow downstream of the reformer fuel cell system, wherein the heat exchanger is used to heat the air for the usable space through the exhaust air. This heat exchanger is also an integral part of the heating device and is, accordingly, often already provided in the mobile equipment.

Finally, a method according to the invention is specified for starting and/or operating a reformer fuel cell system. As has been disclosed above, the exhaust gas is, therein, supplied to at least two components, that is to at least one of the partial reformer systems and/or to the fuel cell. The exhaust gas flows through the particular components according to their respective temperature level in descending order.

BRIEF DESCRIPTION OF THE DRAWINGS

Below, these and further benefits and elements of the invention will be illustrated in more detail by way of examples and by means of the accompanying figures.

DETAILED DESCRIPTION OF THE INVENTION

Figure 1:
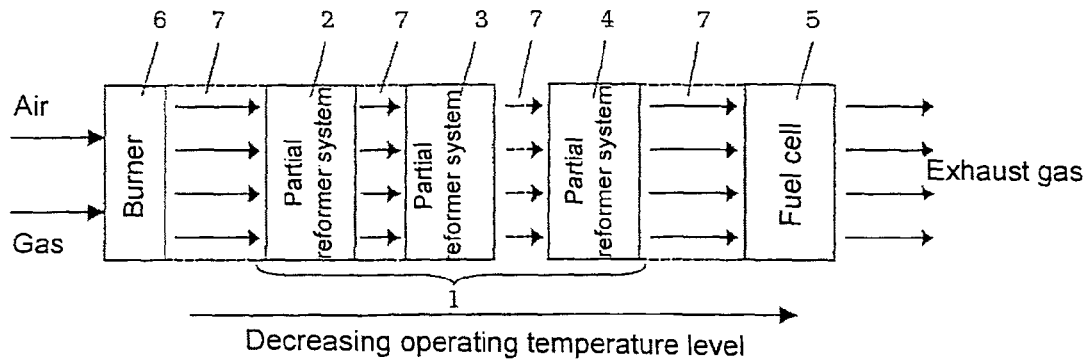
FIG. 1 is a schematic diagram of the structure of a reformer fuel cell system according to the invention.

FIG. 1 is a schematic diagram of the structure of a reformer fuel cell system according to the invention.

A reformer 1 serves to generate a hydrogen-rich gas from a primary fuel. In known manner, the reformer 1 consists of a plurality of partial reformer systems 2, 3, 4. These include, for example, the actual reformer device (e.g. steam reformer, device for partial oxidation, crack reactor, autothermal reformation), vaporizers, shift stages, gas fine-cleaning stages, and heat exchangers. Below, an example of a typical reformer 1 will be illustrated in more detail by means of FIG. 3.

The reformer 1 is followed by a downstream fuel cell 5. As has already been described above, the term "fuel cell" will be generally used for a single fuel cell, but also for a stack of fuel cells or a plurality of stacks of fuel cells. The fundamental structure and the method of operation of the fuel cell 5 are known, so that a more detailed description thereof is not necessary. In principle, the fuel cell 5 generates an electric current while using the hydrogen-rich gas with which it is supplied from the reformer 1.

Since they do not relate to the invention, the (gas) medium flows that are usual in reformer fuel cell systems, particularly the flows of primary fuel gas and reformate gas, water, reaction air, are not shown in FIG. 1.

To the contrary, a burner 6 which is supplied with air and gas, particularly also with the primary fuel, and which generates a hot exhaust gas is provided according to the invention. The hot exhaust gas is supplied to the reformer 1 through an exhaust gas flow duct 7 serving as exhaust gas supply assembly.

The burner 6 is provided outside of the reformer 1 and the fuel cell 5. Thus, it is different from any potential further internal burners which can be arranged in individual components in known manner.

Therein, the various partial reformer systems 2, 3, 4 in the reformer 1 are arranged successively one after the other in an order corresponding to the temperature gradient of their particular operating temperature. That means that the hot exhaust gas is first flowing through the exhaust gas flow duct 7 and into the partial reformer system 2 which requires the highest operating temperature. There, the exhaust gas delivers a part of its thermal energy so that a reaction chamber in the partial reformer system 2 can be brought to the operating temperature required. Ideally, the exhaust gas leaves the partial reformer system 2 with a temperature that corresponds to the operating temperature of the partial reformer system 2.

Thereafter, the exhaust gas is further supplied through the exhaust gas flow duct 7 and into the next partial reformer system 3 which is running at a somewhat lower operating temperature. Although the exhaust gas has, in the meantime, cooled down a little, the system is designed such that the exhaust gas still comprises enough heat to supply the partial reformer system 3 appropriately as well. In like manner, the other partial reformer systems are also successively flown through one after the other in descending order of their operating temperatures. Thereafter, the exhaust gas can be supplied through the exhaust gas flow duct 7 and even to the fuel cell 5 where further heat is delivered.

Therein, the temperature of the exhaust gas leaving the particular partial reformer system should, in the course of time and at the time of leaving the partial reformer system, correspond to the operating temperature of the particular partial reformer system concerned.

As a matter of course, those skilled in the art are at liberty to either have the exhaust gas flow through all components (partial reformer systems 2, 3, 4, fuel cell 5) of the system or select only some of the components. For example, it is absolutely possible that some components in the system do not require any additional heat from outside, either because they are operated in a manner that is insensitive to heat or because the reaction heat they are developing always suffices to maintain the necessary operating temperature.

Figure 2:
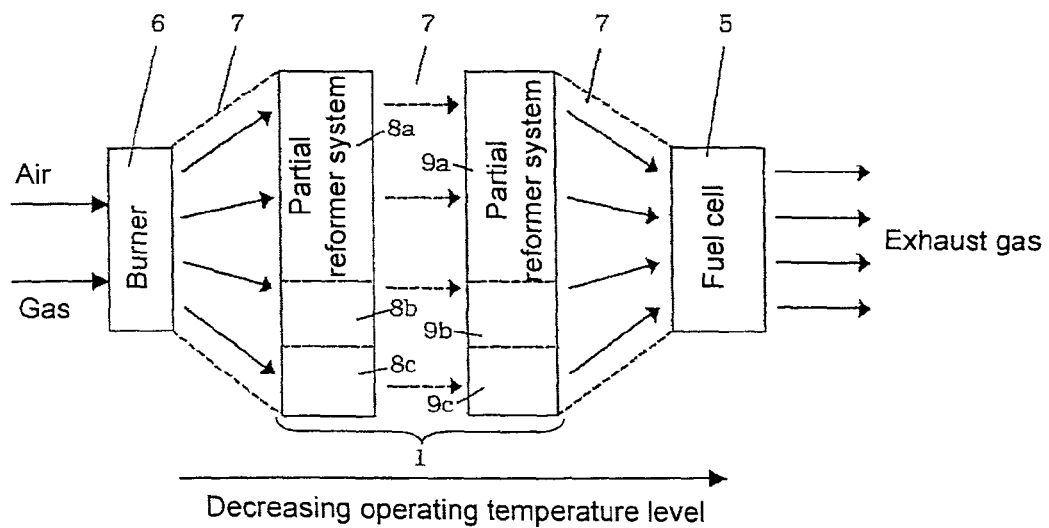
FIG. 2 is a schematic diagram of a further embodiment of the reformer fuel cell system according to the invention.

FIG. 2 shows a further embodiment of the reformer fuel cell system according to the invention, comprising a plurality of partial reformer systems that are connected in series and in parallel in a combined manner.

The exhaust gas from the burner 6 is delivered through the exhaust gas flow duct 7 and to the reformer 1. A plurality of partial reformer systems, i.e. with reference numbers 8a, 8b and 8c, are arranged in parallel in reformer 1, with the result that exhaust gas flows through the plurality of partial reformer systems simultaneously. Further partial reformer systems 9a, 9b and 9c are arranged downstream of the partial reformer systems 8a to 8c, so that a series connection (serial flow) is implemented between 8a and 9a, between 8b and 9b as well as between 8c and 9c. As a matter of course, the flows of exhaust gas can also be supplied in a different manner, e.g. from the partial reformer system 8a to the partial reformer system 9c or to the partial reformer systems 9a and 9b. It is also possible to mix the flows of exhaust gas again after they have initially flown through individual components separately. Then the exhaust gas flows through the partial reformer systems 9a to 9c in parallel again. Only thereafter will the exhaust gas be recombined in the exhaust gas flow duct 7 and supplied to the fuel cell 5. After having left the fuel cell 5, the exhaust gas can be further used to heat a usable space or discharged to the environment through a chimney.

The name of the exhaust gas flow duct 7 has been selected to stand in place for a plurality of individual ducts which may also be provided in the components or even between the components, depending on requirements. Here, it is up to those skilled in the art to dimension the ducts with regard to their number, length, shape and cross-sectional size such that it is always the amount of heat desired that the exhaust gas delivers to the environment of the duct, hence particularly to the particular component, through the external surface of the duct. The ducts can be passed along the components on their outside, so that the heat of the exhaust gas must penetrate into the interior region through the outer wall of the components, in order to become effective in the particular reaction chamber.

As an alternative, the ducts carrying the exhaust gas can also be passed into the reaction chambers themselves or as near to the reaction chambers (inner walls) as possible, in order to facilitate the transfer of heat from the exhaust gas into the reaction chamber.

Figure 3:
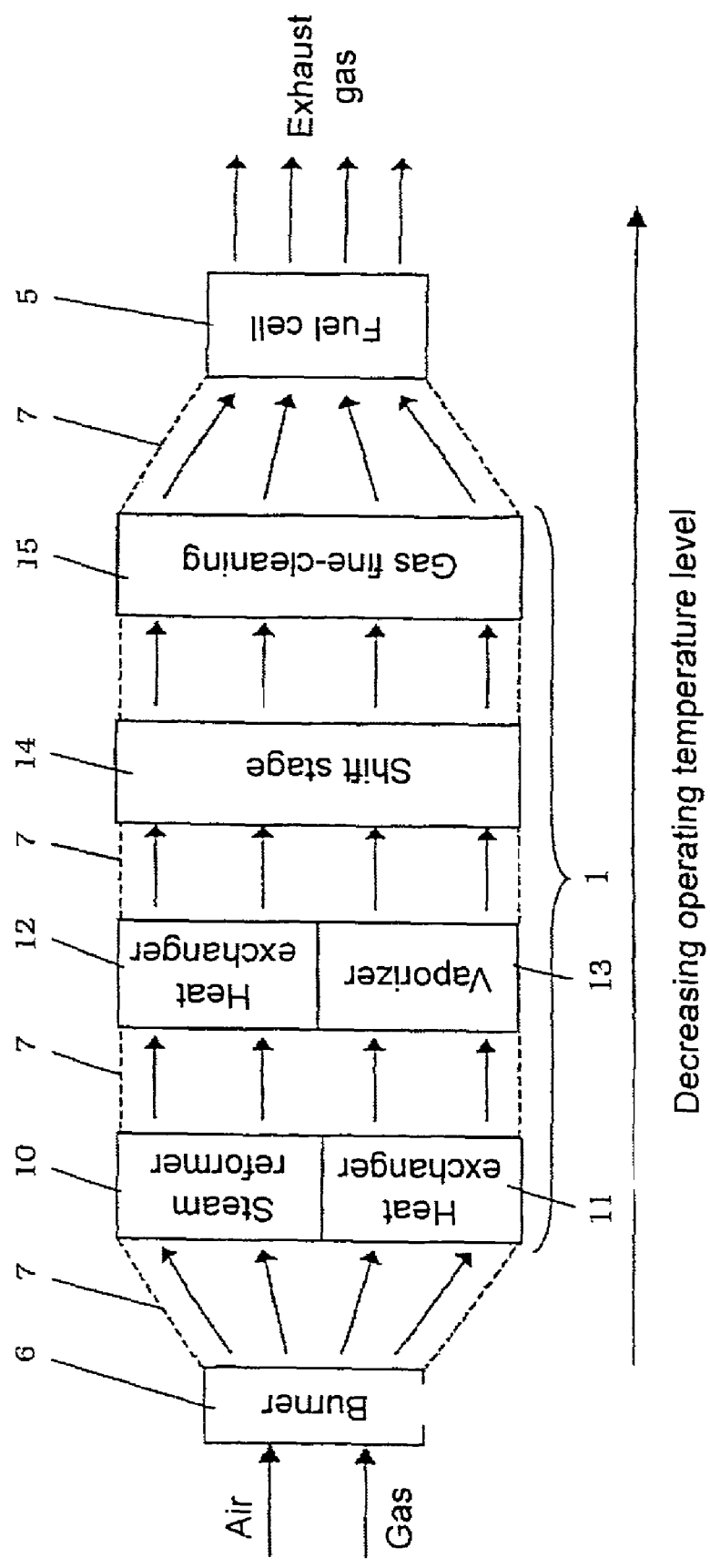
FIG. 3 is a schematic diagram of an implementation of the system of FIG. 2.

FIG. 3 is a schematic diagram of a concrete implementation of the system that has been roughly described in FIG. 2.

According to that, the exhaust gas from the burner 6 is supplied through the exhaust gas flow duct 7 (here, a plurality of ducts should, of course, be provided) and, in parallel, to a steam reformer 10 and a heat exchanger 11. Thereafter, the exhaust gas from the steam reformer 10 is supplied to a heat exchanger 12 and the exhaust gas from the heat exchanger 11 is supplied to a vaporizer 13. These are followed by a downstream shift stage 14 which, in turn, is followed by a gas fine-cleaning stage 15. Thereafter, the exhaust gas is supplied to the fuel cell 5.

As has been disclosed above, the exhaust gas flows through the various components in relation to their temperatures in descending order. Thus, the steam reformer 10 and the heat exchanger 11 have an operating temperature ranging from 650 to 750° C. for heating the feed gas/steam. The downstream heat exchanger 12 that is provided for cooling the reformate as well as the vaporizer 13 are operated at temperatures ranging from 400 to 500° C. As compared with that, the operating temperature of the shift stage 14 that is again connected downstream ranges from 300 to 350° C. Gas fine-cleaning (reference number 15), however, is carried out at 180 to 250° C. only. Finally, the fuel cell is operated at a temperature ranging from 50 to 90° C.

The temperature levels may vary depending on the type and embodiment of the reformer system and the fuel to be reformed.

Figure 4:
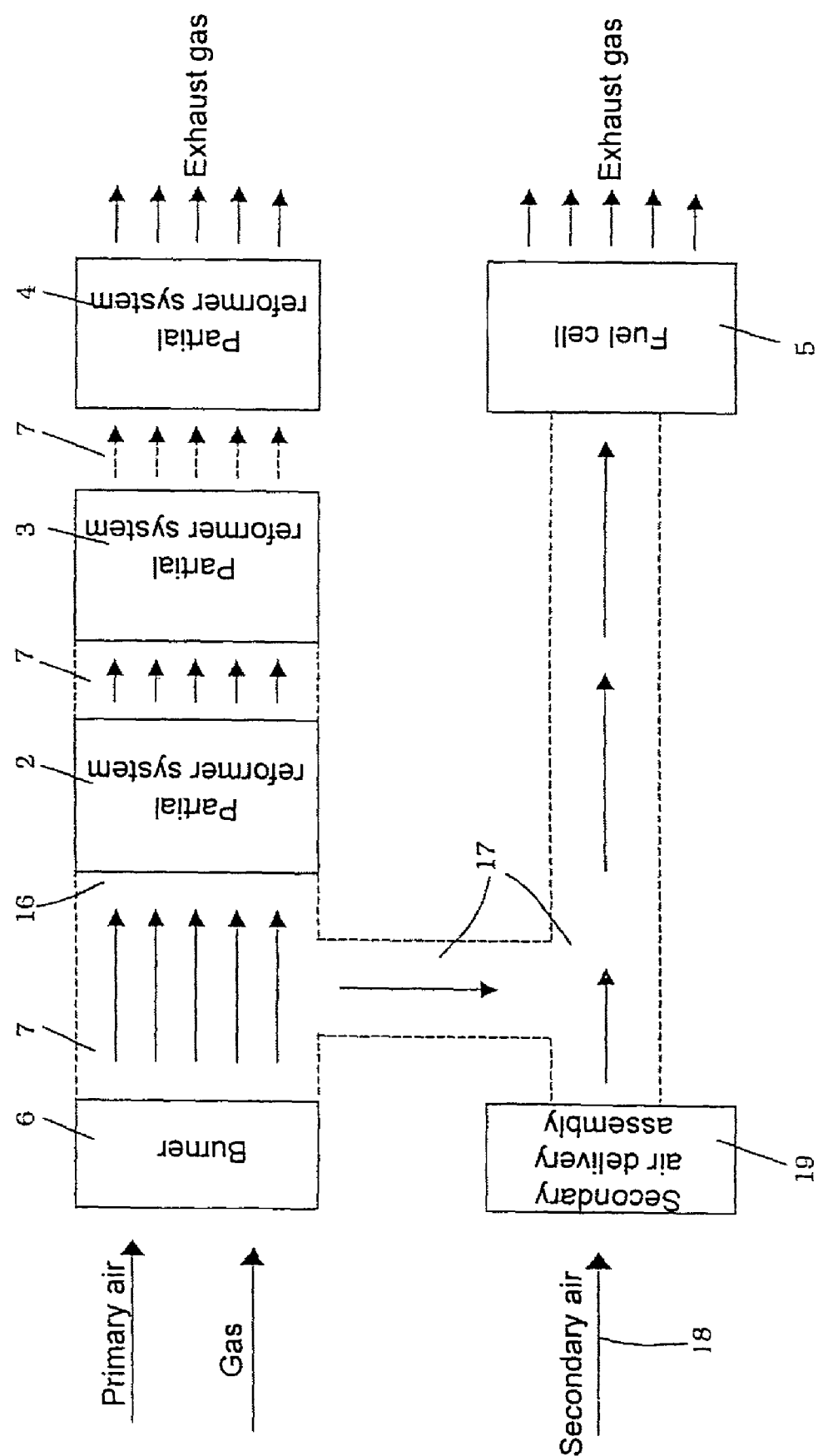
FIG. 4 is a schematic diagram of a further embodiment of the invention.

FIG. 4 shows a further embodiment of the invention. For simplification purposes, identical components and structural elements that have already been illustrated above, for example with reference being made to FIG. 1, will be referred to in the same manner in FIG. 4.

Contrary to the embodiment shown in FIG. 1, the exhaust gas supply assembly 7 shown in FIG. 4 comprises a first supply section 16 and a second supply section 17. As a result, the exhaust gas from the burner 6 is divided into two flows.

The exhaust gas that is supplied through the first supply section 16 is directed to the partial reformer systems 2, 3, 4. The exhaust gas in the second supply section 17, however, is directly supplied to the fuel cell 5. In this manner, it is possible to heat the fuel cell 5 directly.

As a supplement, secondary air 18 is supplied to the exhaust gas in the second supply section 17, in order to lower the temperature of the exhaust gas in the second supply section 17 and, thus, to prevent the fuel cell 5 from being heated up too strongly.

A blower 19 serving as a secondary air delivery assembly is provided to support the flow of secondary air.

At a point upstream of the burner 6, the secondary air 18 can be drawn off the primary air that is supplied to the burner 6.

The blower 19 can be operated even if the burner 6 is turned off. In this case, the blower 19 delivers secondary air 18 to the fuel cell 5 to cool down the fuel cell 5 during operation.

In a variant of FIG. 4 that is not shown here, secondary air is also supplied to individual partial reformer systems, in order to set their temperature to the desired operating temperature value.

The arrangement according to the invention is advantageous in that it comprises a compact structure, in that the partial reformer systems and the fuel cell can be directly heated up to the level of their particular operating temperature in a selective manner, in that additional heat exchangers and/or heat transport media can be done without, in that temperature-critical partial systems, such as the fuel cell and the gas cleaning stages, are protected against overheating, and in that the heating process is controlled in a simplified manner.

As a matter of principle, the system according to the invention is not only suitable for starting the system, but also for providing thermal energy during operation with reduced power (part load mode), if the internal exhaust heat of the reformer system 1 and the fuel cell 5 fails to be sufficient for maintaining the system at the required operating temperature level. During normal operation and in the full load mode, the heat is, however, usually provided by burners (not shown) that are integrated in the individual partial reformer systems (e.g. in the steam reformer 10 and in the vaporizer 13). The burner 6 can then be turned off. As a matter of course, the system according to the invention can also be used in the full load mode. Likewise, the reaction heat developing in the partial reformer systems and in the fuel cell 5 during operation can be used for heat supply. In addition, external burners can be connected here as well.

The reformer device used in the reformer 1 can be an autothermal reformer device, a steam reformer, a device for partial oxidation, or a crack reactor. A steam reformer is considered to be the preferred embodiment. High-temperature and low-temperature shift, selective oxidation or methanation can be used in the following gas processing stage. As a matter of principle, the partial reformer systems can comprise any geometrical shape, wherein the design as plate reactors is considered to be the preferred embodiment because, in this case, heating ducts (for the exhaust gas flow duct 7) can be integrated in the individual components in a particularly easy manner, e.g. as cross flow heat exchanger ducts. Low-temperature and high-temperature polymer electrolyte membrane fuel cells are equally appropriate as fuel cell types.

As a matter of principle, any burner design can be used as an external burner 6. The preferred burner is a surface burner with a low flame height, e.g. a burner with a ceramic or metallic surface or a surface of fiber materials, such as a ceramic fiber mat coated with silicon carbide.

As a matter of principle, the reformer fuel cell system according to the invention can be formed as a unit or as a spatially separated arrangement of separate single systems. For the major part of application cases, however, single systems (components) comprising identical or highly similar operating temperature levels are combined to form partial systems.

When high-temperature polymer electrolyte membrane fuel cells comprising a CO compatibility that is essentially higher than that of low-temperature polymer electrolyte membrane fuel cells are used, the gas fine-cleaning stage 15 (FIG. 3) can be done without wherein the fuel cell with an operating temperature level ranging from ambient temperature to 250° C., preferably ranging from 140 to 200° C., can be used instead.

The individual ducts of the exhaust gas flow duct 7 that are provided for supplying therethrough the hot burner exhaust gases in the partial reformer systems and in the fuel cell may comprise any geometries desired. For production reasons (etching or embossing technology; laser; eroding), preferred use is made of longitudinal ducts, that are straight ducts with a largely rectangular cross-section. The position of the exhaust gas flow ducts 7 in relation to the ducts (not shown) containing the reactands (actual medium flows) can be any position desired. Cross ducts where the exhaust gas flow ducts 7 and the further medium ducts are intersecting each other are the preferred type of arrangement. Their number and arrangement in the individual components depend on the necessary operating temperature level, the geometry of the exhaust gas flow ducts, the mass of the various components to be heated up, and the quality of heat transfer. Appropriately, the exhaust gas ducts are designed such that the heat transfer can be maximized and the pressure drop in the exhaust gas flow can be minimized.

Between the individual stages of the reformer fuel cell system, a thermal insulation against an undesired heat transfer can be implemented by insulating materials and/or by spacing the components apart from each other in an appropriate manner. If provided in a spatially separated arrangement, stages running at different operating temperature levels are, preferably, spaced apart from each other by distances ranging from 5 to 100 mm; particularly preferred distances range from 10 to 40 mm.

To minimize heat losses to the outside and to seal the exhaust gas flow duct, it is, appropriately, recommended that the complete reformer fuel cell system be enclosed with insulating material and be provided with a gas-proof casing.

Primarily, the reformer fuel cell system according to the invention can be used for supplying on-board current in mobile equipment, such as motor homes, travel trailers, commercial vehicles, or boats. Such mobile equipment comprises a usable space, such as a cab, a cabin or the living space in a travel trailer or a motor home. However, the reformer fuel cell system has not only been designed for mobile applications, but also for stationary applications. The preferred power values range to approx. 3 kW (electrically); particularly preferred electric power ranges are from 50 to 500 W. Preferred fuels are propane or propane-butane mixtures, but other liquid or gaseous hydrocarbon compounds (e.g. diesel fuel, gasoline, methanol and biological fuels) can also be used provided the fuel is processed appropriately.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

The invention claimed is:

1. A reformer fuel cell system, comprising
a plurality of components having an operating temperature, said plurality of components comprising a plurality of partial reformer systems and a fuel cell;
said plurality of partial reformer systems forming a reformer for generating a hydrogen-rich gas from a primary fuel; and
said fuel cell generating an electric current by using the hydrogen-rich gas;
wherein said reformer fuel cell system further comprises:
a burner device arranged outside of said reformer and said fuel cell, wherein said burner device generates a hot exhaust gas for heating at least one of said plurality of partial reformer systems and for heating said fuel cell;
an exhaust gas supply assembly for supplying the exhaust gas to at least two of said plurality of components, said at least two components being at least one of the partial reformer systems and said fuel cell; wherein the exhaust gas supply assembly defines a flow path of the exhaust gas such that the exhaust gas flows to and/or through at least one of said plurality of components comprising said plurality of partial reformer systems and said fuel cell according to the level of the particular operating temperature of said plurality of components in descending temperature order.

2. The reformer fuel cell system according to claim 1, wherein said plurality of components comprise reaction chambers defined by walls, the exhaust gas supply assembly being designed such that the exhaust gas can flow to the plurality of components from the outside and the heat of the exhaust gas can be transferred into said reaction chambers of the plurality of components via said walls from the outside.

3. The reformer fuel cell system according to claim 1, wherein the exhaust gas supply assembly comprises ducts for supplying the exhaust gas.

4. The reformer fuel cell system according to claim 3, wherein the ducts have a surface and are arranged in said reaction chambers of the plurality of components.

5. The reformer fuel cell system according to claim 4, wherein the surface of the ducts effective for heat transfer from the exhaust gas into the particular reaction chamber is adjusted according to the heat requirements of a particular component that are depending on the heat required for reaching the operating temperature in said component.

6. The reformer fuel cell system according to claim 5, wherein at least one of the length, number, cross-sectional shape and cross-sectional dimensions of a duct assigned to a component are adjusted to the heat requirements of said component.

7. The reformer fuel cell system according to claim 6, further comprising heating ducts provided in the components which can be flown through by both the exhaust gas supplied by the exhaust gas supply assembly and a hot gas generated in the components during operation of the system.

8. The reformer fuel cell system according to claim 1, wherein the exhaust gas supply assembly allows a serial flow through at least a part of the plurality of components.

9. The reformer fuel cell system according to claim 1, wherein the exhaust gas supply assembly allows a parallel flow through at least a part of the plurality of components.

10. The reformer fuel cell system according to claim 1, wherein the exhaust gas supply assembly is divided into a first supply section downstream of the burner device and a second supply section upstream of the plurality of components; and the exhaust gas flow is distributed to said first supply section and said second supply section.

11. The reformer fuel cell system according to claim 10, wherein exhaust gas can be supplied to at least one of said plurality of partial reformer through the first supply section.

12. The reformer fuel cell system according to claim 10, wherein exhaust gas can be supplied to the fuel cell through the second supply section.

13. The reformer fuel cell system according to claim 12, wherein secondary air can be supplied to at least one of the plurality of components.

14. The reformer fuel cell system according to claim 13, wherein secondary air can be admixed to the exhaust gas in the second supply section.

15. The reformer fuel cell system according to claim 14, further comprising a heat exchanger, wherein exhaust gas flowing through the second supply section is supplied to said heat exchanger for heating the secondary air, said heated secondary air being supplied to the fuel cell.

16. The reformer fuel cell system according to claim 13, wherein the secondary air can be drawn off a primary air for being supplied to the burner device.

17. The reformer fuel cell system according to claim 13, further comprising a secondary air delivery assembly for delivering the secondary air in a forced manner.

18. The reformer fuel cell system according to claim 17, wherein the secondary air delivery assembly is activatable independently of an operating state of the burner device.

19. The reformer fuel cell system according to claim 1, wherein the components of said plurality of components that require as similar an operating temperature as possible are arranged adjacent to each other.

20. The reformer fuel cell system according to claim 1, wherein in relation to the particular operating temperature of said plurality of components, the components of said plurality of components are arranged next to each other and/or one after the other in descending temperature order.

21. The reformer fuel cell system according to claim 1, wherein the plurality of partial reformer systems comprise at least one component selected from the group consisting of the reformer device, a vaporizer, one or more shift stages, one or more gas fine-cleaning stages, and one or more heat exchangers.

22. The reformer fuel cell system according to claim 1, wherein the fuel cell is at lest one type of fuel cell selected from the group consisting of a low-temperature polymer electrolyte membrane fuel cell and a high-temperature polymer electrolyte membrane fuel cell.

23. The reformer fuel cell system according to claim 1, further comprising a thermal insulation between neighboring components of said plurality of components.

24. The reformer fuel cell system according to claim 1, wherein at least two of the components of said plurality of components form a structural unit.

25. The reformer fuel cell system according to claim 24, wherein at least two of the components that are neighboring each other are arranged separated from a neighboring component spatially.

26. The reformer fuel cell system according to claim 1, wherein the burner device is operable with the primary fuel.

27. The reformer fuel cell system according to claim 1, wherein primary air is supplied to said burner device for burning the primary fuel and for generating the exhaust gas; and the exhaust gas is supplied with secondary air.

28. The reformer fuel cell system according to claim 27, wherein the secondary air is supplied through said secondary air delivery assembly in a forced manner.

29. The reformer fuel cell system according to claim 1, wherein the burner device is operable with air stoichiometries ranging from $\lambda=1.0$ to $4.0$.

30. The reformer fuel cell system according to claim 29, wherein the air stoichiometry and/or the heat output of the burner device is defined in relation to the operating temperature of the component of said plurality of components that has the highest operating temperature value.

31. The reformer fuel cell system according to claim 1, further comprising an air supply assembly for supplying combustion air to the burner device and for delivering the exhaust gas through the exhaust gas supply assembly.

32. The reformer fuel cell system according to claim 1, wherein:
the burner device is an integral part of a heating device for generating heat for a usable space; and
the exhaust gas from the burner device is usable for heating the usable space after leaving the reformer fuel cell system.

33. The reformer fuel cell system according to claim 32, wherein said heat exchanger heats air for the usable space arranged in the exhaust gas flow downstream of the reformer fuel cell system.

34. A method for starting and/or operating a reformer fuel cell system wherein the reformer fuel cell system comprises:
- a plurality of components comprising a plurality of partial reformer systems and a fuel cell:
- said plurality of partial reformer systems forming a reformer for generating a hydrogen-rich gas from a primary fuel;
- said fuel cell generating an electric current by using the hydrogen-rich gas; and
- wherein the reformer fuel cell system further comprises:
- a burner device arranged outside of said reformer and said fuel cell for generating a hot exhaust gas for heating at least one of said plurality of partial reformer systems and for heating said fuel cell; wherein said method comprises the step of:
- supplying the exhaust gas to at least two of said plurality of components, said at least two components being at least one of the partial reformer systems and said fuel cell; and wherein
- the exhaust gas flows to and/or through said plurality of components comprising said plurality of partial reformer systems and said fuel cell according to the level of the particular operating temperature of said plurality of components in descending temperature order.

35. The reformer fuel cell system according to claim 29, wherein the burner device is operable with air stoichiometries ranging from $\lambda=1.2$ to 3.0.

36. A method for operating a reformer fuel cell system wherein the reformer fuel cell system comprises:
- a plurality of components comprising a plurality of partial reformer systems and a fuel cell:
- said plurality of partial reformer systems forming a reformer for generating a hydrogen-rich gas from a primary fuel;
- said fuel cell generating an electric current by using the hydrogen-rich gas; and
- wherein the reformer fuel cell system further comprises a burner device arranged outside of said reformer and said fuel cell for generating a hot exhaust gas for heating at least one of said plurality of partial reformer systems and said fuel cell;
- wherein said method comprises the step of:
- supplying the exhaust gas to at least two of said plurality of components, said at least two components being at least one of the partial reformer systems and said fuel cell; and wherein
- the exhaust gas flows to and/or through said plurality of components comprising said plurality of partial reformer systems and said fuel cell according to the level of the particular operating temperature of said plurality of components in descending temperature order.

* * * * *